United States Patent

[11] 3,632,056

[72] Inventors: Ronald J. Hibbard
Royal Oak;
Robert W. Stoffel, Ferndale, both of Mich.
[21] Appl. No.: 16,313
[22] Filed: Mar. 4, 1970
[45] Patented: Jan. 4, 1972
[73] Assignee: Jim Robbins Seat Belt Company
Mt. Clemens, Mich.

[54] INERTIA REEL
21 Claims, 7 Drawing Figs.

[52] U.S. Cl. ........................................... 242/107.4
[51] Int. Cl. ........................................... A62b 35/00
[50] Field of Search ........................... 242/107 R,
107 SB, 107.4, 107.5, 107.6, 107.7; 297/388, 389;
280/150 SB

[56] References Cited
UNITED STATES PATENTS

| | | | |
|---|---|---|---|
| 3,450,368 | 6/1969 | Glauser et al. | 242/107.4 |
| 3,348,789 | 10/1967 | Hirsch | 242/107.4 |
| 3,412,952 | 11/1968 | Wohlert et al. | 242/107.4 |
| 3,446,454 | 5/1969 | Kovacs et al. | 242/107.4 |
| 3,482,799 | 12/1969 | Wrighton et al. | 242/107.4 |

Primary Examiner—Stanley N. Gilreath
Assistant Examiner—Werner H. Schroeder
Attorneys—Marvin Bressler and Jonathan Plaut ABSTRACT: A seat belt retractor including a generally U-shaped bracket rotatably supporting a shaft. A reel is secured to the shaft and includes a pair of platelike ratchet members. A locking pawl is supported by the bracket for movement to and from a locked position engaging the ratchet members to prevent extension of the seat belt which is wound about the reel. A first clutch member is in frictional driven engagement with the reel and coacts with the locking pawl for preventing the locking pawl from moving to the locked position during continuous unwinding rotation of the reel from the fully wound position and until winding rotation of the reel subsequent to the continuous unwinding. A second clutch plate is disposed on the shaft and coacts with the locking pawl for moving the locking pawl to the locked position in response to movement of an inertia wheel disposed upon the shaft, the inertia wheel moving axially on the shaft in response to a predetermined rotational acceleration of the reel in the unwind direction. A deactivating bar is disposed on the opposite side of the second clutch plate from the inertia wheel for rendering the second clutch plate nonresponsive to the inertia wheel while the first clutch plate is preventing the locking pawl from moving to the locked position.

INVENTORS
Robert W. Stoffel
BY Ronald J. Hibbard
Barnard, McGlynn & Reising
ATTORNEYS

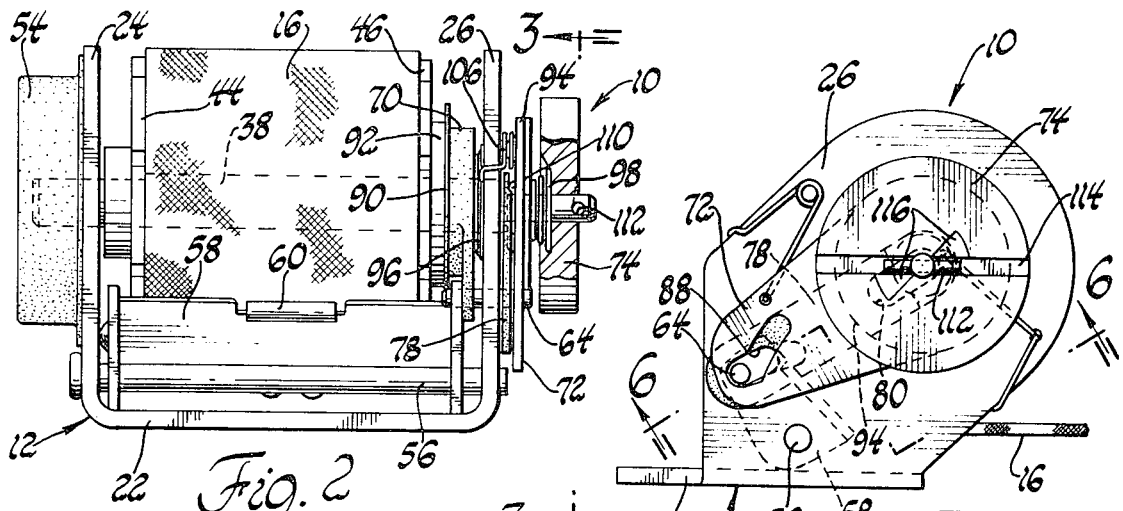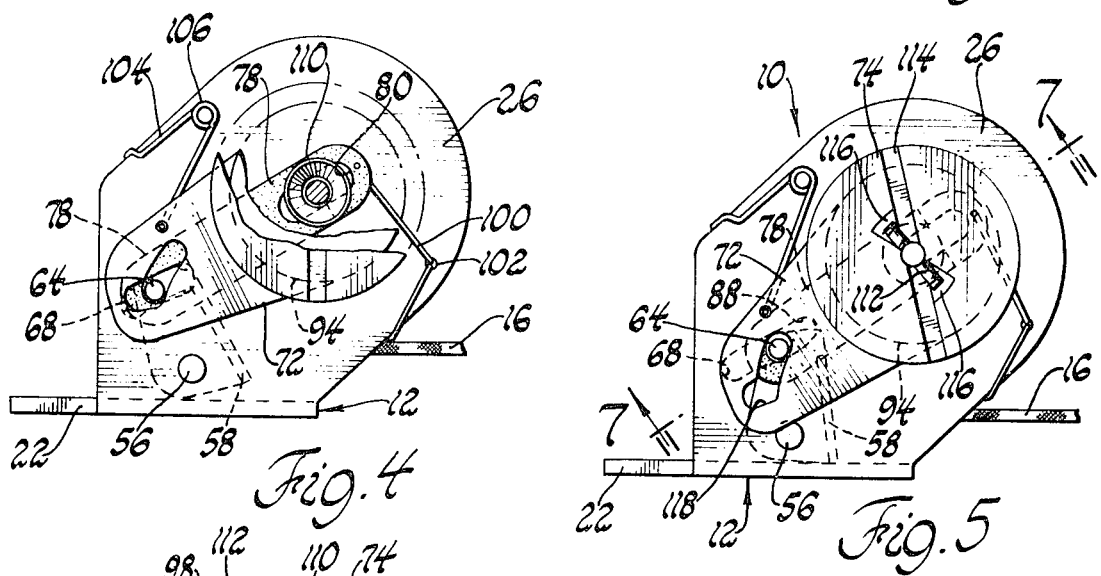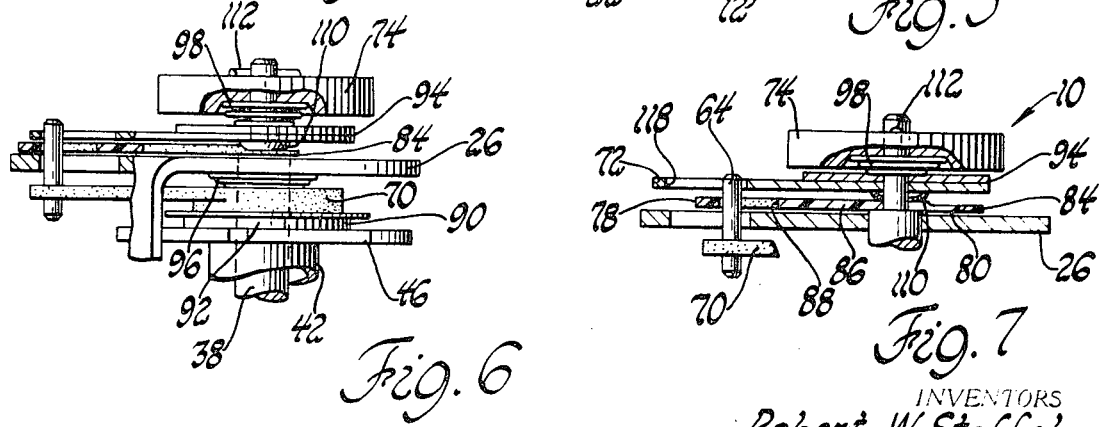

INERTIA REEL

This invention relates to a retracting reel assembly and more specifically to a seat belt retractor. More specifically, this invention relates to a retracting reel assembly including a reel means about which a seat belt is wound.

There are various seat belt retractors known in the prior art which allow the user to extend the seat belt from the retractor and couple it to another seat belt portion while allowing some degree of freedom of movement of the user until a predetermined acceleration is applied to the seat belt to cause the retractor to lock and prevent further extension of the seat belt thereby restraining the user.

One of the problems associated with such prior art retractors is that the sensitivity to acceleration of the seat belt is not easily built in or adjusted and the retractor inadvertently locks to prevent extension of the seat belt when the seat belt is initially unwound from the retractor. This problem has been solved by various retractors which include a mechanism to prevent locking of the retractor during initial extension of the seat belt. On such retractor is disclosed in applicant's copending application Ser. No. 813,918 filed Apr. 7, 1969 and assigned to the assignee of the instant invention. This prior art retractor includes an inertia-responsive locking means which is rendered inoperative until a predetermined length of seat belt is unwound from the reel. This is accomplished by utilizing a spiral cam which rotates with the reel and coacts with a wirelike cam follower. The wirelike cam follower coacts with a wire linkage which in turn coacts with a clutch plate to prevent the clutch plate from moving the locking pawl to the locked position until a predetermined number of revolutions of the reel while the belt is initially being continuously unwound from the reel.

While this prior art retracting reel assembly is very satisfactory, the instant invention is an improvement thereover. One of the advantages of the retracting reel assembly of the instant invention over the prior art is that the inertia responsive means is rendered inoperative while the seat belt is being continuously unwound from the reel from the fully wound position until there is a slight winding motion and there is no limitation upon the amount of initial continuous unwinding. Also, the wirelike linkage mechanism utilized in the prior art retracting assembly mentioned above is not as durable as desired and is subject to wear and malfunction. The retracting reel assembly of the instant invention, however, overcomes that problem by providing a simple, and durable combination of components.

Other objects and attendant advantages of the present invention will be readily appreciated as the same becomes better understood by reference to the following detailed description when considered in connection with the accompanying drawings wherein:

FIG. 2 is a plan view of the preferred embodiment;

FIG. 3 is a side view taken substantially along line 3—3 and showing the components in the position where the seat belt is fully wound upon the reel means;

FIG. 4 is a view similar to FIG. 3 showing the components in the position where the seat belt has been slightly wound upon the reel means after it has been continuously unwound therefrom from the fully wound position;

FIG. 5 is a view similar to FIGS. 3 and 4 but showing the components in the locked position to prevent further unwinding of the seat belt;

FIG. 6 is a fragmentary cross-sectional view taken substantially along line 6—6 of FIG. 3; and FIG. 7 is a fragmentary cross-sectional view taken substantially along line 7—7 of FIG. 5.

Referring now to the drawings wherein like numerals indicate like or corresponding parts throughout the several views, a retracting reel assembly constructed in accordance with the invention is generally shown at 10.

Figure 1:
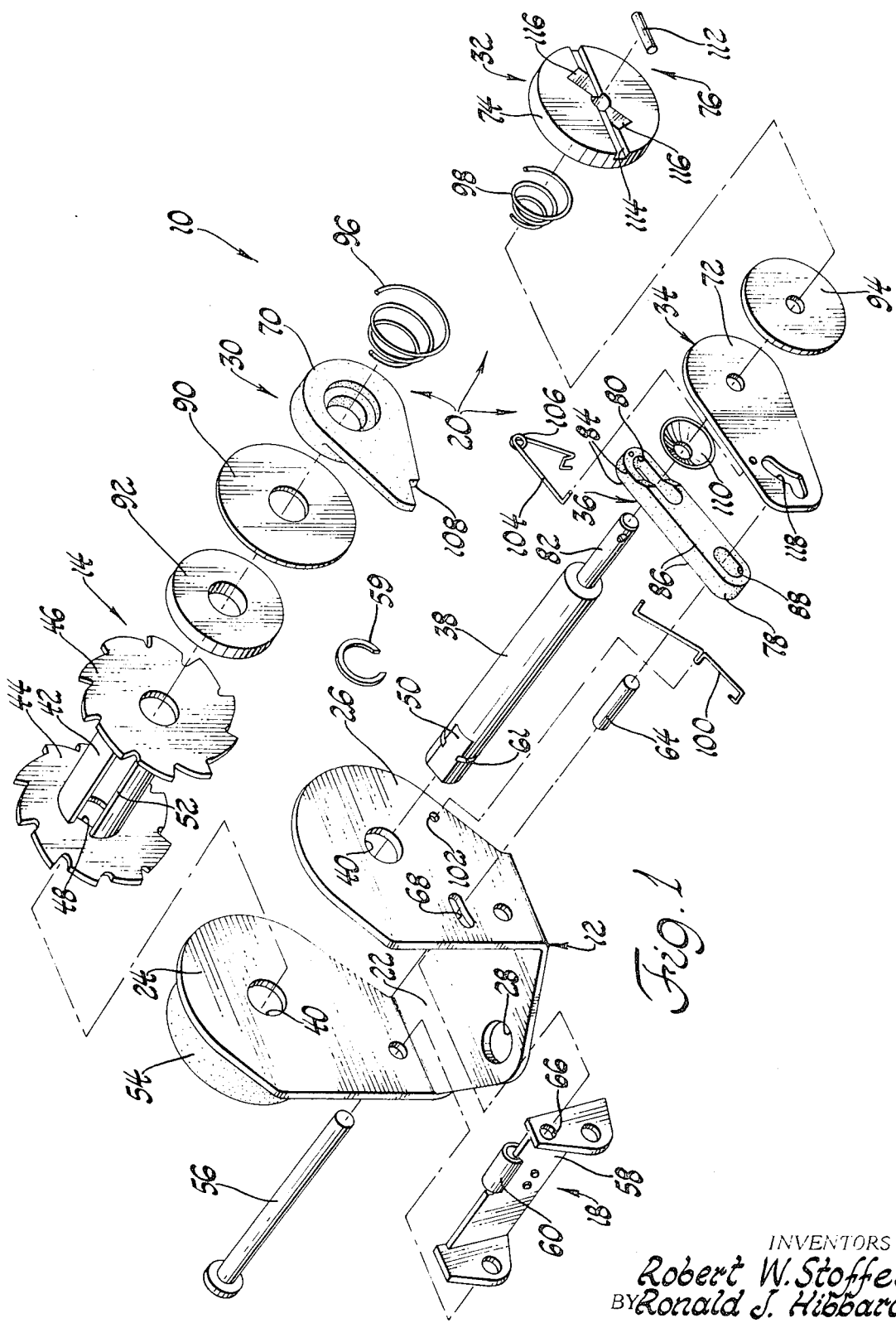
FIG. 1 is an exploded perspective view of a preferred embodiment of the invention.

The retracting reel assembly 10 includes a support means comprising the generally U-shaped bracket 12, a reel means generally shown at 14 and rotatably supported by the bracket 12, an elongated flexible element defining a seat belt 16 connected to the reel means 14 and adapted to be wound thereon and unwound therefrom, locking means generally indicated at 18 and movable between locked and unlocked positions for respectively preventing and allowing rotation of the reel means 14, and control means generally shown at 20 for moving the locking means 18 to the locked position in response to a predetermined rotational acceleration of the reel means 14 in the unwind direction after rotation of the reel means 14 in the winding direction which is in turn immediately subsequent to any degree of unwinding rotation commencing from the fully wound position.

The generally U-shaped bracket defining the support means 12 has a base 22 and parallel first and second sidewalls 24 and 26 respectively. The base 22 has a hole 28 therein for attaching the U-shaped bracket to a support structure such as the floor of an automobile.

The control means 20 controls movement of the locking means 18 to the locked position and includes a first clutch means generally indicated at 30, an inertia means generally indicated at 32, a second clutch means generally indicated at 34, and deactivating means generally indicated at 36.

The first clutch means 30 prevents the locking means 18 from moving to the locked position during continuous unwinding rotation of the reel means 14 from the fully wound position and until winding rotation of the reel means 14 subsequent to the continuous unwinding.

The inertia means 32 is disposed in an operative condition in response to a predetermined rotational acceleration of the reel means 14 in the unwind direction.

The second clutch means 34 moves the locking means 18 to the locked position in response to the inertia means 32 being in the operative condition.

The deactivating means 36 renders the second clutch means 34 nonresponsive to the inertia means 32 while the first clutch means 30 is preventing the locking means 18 from moving to the locked position.

The reel means 14 includes a shaft 38 which extends between and through holes 40 in the sidewalls 24 and 26 so as to be rotatably supported thereby. The reel means 14 further includes a cylinder 42 concentrically disposed about the shaft 38 and circular platelike ratchet members 44 and 46 secured to the ends of the cylinder 42. The ratchet members 44 and 46 are nonrotatably attached to the shaft 38 in that the ratchet member 44 has a flat portion 48 which coacts with the flat portion 50 on the shaft 38. The cylinder 42 has a slot 52 extending therealong and the seat belt 16 extends through the slot 52 and is connected to the shaft 38 by being looped thereabout. Also included in the reel means 14 is a windup means disposed outwardly of the first side 24. The windup means is a spring disposed within the housing 54 and reacting between the bracket 12 and the shaft 38 for urging the shaft 38 to rotate in the winding direction. The spring is of the well-known type utilized in similar retractors and is therefore not shown in detail.

The locking means 18 includes a rod 56 extending between and supported by the sidewalls 24 and 26 and a locking pawl 58 supported by the rod 56 for movement into the locked position in engagement with the ratchet members 44 and 46 as illustrated in FIG. 5.

There is also included return means comprising the clip 60 attached to the locking pawl 58 for returning the locking pawl 58 to the unlocked position illustrated in FIG. 3 when the reel means 14 returns to the fully wound position. The clip 60 coacts with the seat belt 16 as the seat belt is wound upon the reel means 14 to move the locking pawl 58 to the position shown in FIG. 3. The locking means 18 also includes a projection 64 which is disposed in a hole 66 and is rigidly secured to the locking pawl 58. The projection 64 extends through the elongated slot 68 in the sidewall 26.

The axis of rotation of the reel means 14 is the axis of the shaft 38 and the first clutch means 30 is supported for rotation about the axis of rotation of the reel means 14. Also, the second clutch means 34 and the inertia means 32 are supported for rotation about the axis of rotation of the reel means 14.

The first clutch means 30 is disposed in frictional driven relationship with the reel means 14. The second clutch means 34 is disposed in frictional driven relationship with the inertia means 32 when the second clutch means 34 is moving the locking pawl 58 of the locking means to the locked position.

The first clutch means 30 includes a first clutch plate 70 rotatably supported on the shaft 38 for rotation relative thereto. The second clutch means 34 includes a second clutch plate 72 which is supported by the shaft 38 for rotation relative thereto. The inertia means 32 includes an inertia wheel 74 which is supported on the shaft 38, and displacement means generally indicated at 76 for axially moving the inertia wheel 74 along the shaft 38 in response to a predetermined acceleration of the reel means 14 in the unwinding direction.

The deactivating means 36 includes a bar 78 with an elongated slot 80 therein disposed about a small diameter portion 82 of the shaft 38. The bar 78 is disposed between the side wall 26 of the support means 12 and the second clutch plate 72. The second clutch plate 72 is in turn disposed between the bar 78 and the inertia wheel 74. The bar 78 has a first thin thickness 84 along a first portion of the slot 80 for allowing axial movement of the inertia wheel 74 without causing rotation of the second clutch plate 72. The bar 78 has a second thicker thickness 86 along a second portion of the slot 80, which second thickness is thicker than the first thickness 84, for reacting with the second clutch plate 72 to cause rotation of the second clutch plate 72 in response to axial movement of the inertia wheel 74.

A connection means operatively interconnects the bar 78 and the locking means 18 for controlling radial movement of the bar 78 relative to the axis of the shaft 38. More specifically, the connection means includes an elongated slot 88 in the bar 78 which is disposed about the projection or pin 64.

A first friction disk 90 is disposed about the shaft 38 between the first clutch plate 70 and the ratchet member 46 of the reel means 14 for transmitting rotary motion of the reel means 14 to the first clutch plate 70. A washer member 92 is disposed between the first friction disk 90 and the adjacent ratchet member 46 so that the first friction disk 90 actually reacts between the washer member 92 and the first clutch plate 70, although it will be recognized that it is not necessary to utilize the washer member 92.

A second friction disk 94 is disposed between the inertia wheel 74 and the second clutch plate 72 for transmitting rotary motion of the inertia wheel 74 to the second clutch plate 72.

A first spring means comprising a coil spring 96 is disposed between the wall 26 of the support bracket 12 and the first clutch plate 70 to urge the first clutch plate 70 against the first friction disk 90. A second spring means comprising the coil spring 98 is disposed between the inertia wheel 74 and the second friction disk 94 for urging the second friction disk 94 against the second clutch plate 72.

A first biasing means comprising the wire spring 100 urges the bar 78 to move radially relative to the axis of the shaft 38 in the direction to dispose the second or thicker thickness 86 about the reduced diameter portion 82 of the shaft. The spring 100 has one end engaging the edge of the sidewall 26 and has a loop disposed in a hole 102 in the sidewall 26 with another leg attached to the bar 78.

There is also included a second biasing means comprising a wirelike spring 104 for urging the second clutch plate 72 to rotate in the winding direction or clockwise as viewed in FIGS. 3 through 5. The spring 104 has one end secured in a hole in the second clutch plate 72 and has a plurality of coils 106 and a second leg which is disposed about the edge of the side 26.

The first clutch plate 70 includes a shoulder 108 therein for reacting with the projection or pin 64 to prevent the locking pawl 58 from moving to the locked position.

A cup-shaped washer 110 is disposed about the small portion 82 of the shaft 38 between the bar 78 and the second clutch plate 72. The outer periphery of the washer 110 engages the second clutch plate 72.

The large diameter portion of the shaft 38 extends through the washer member 92, the first friction disk 90, the first clutch plate 70, and the sidewall 26. The smaller diameter portion 82 of the shaft extends through the bar 78, the washer 110, the second clutch plate 72, the second friction disk 94, and the inertia wheel 74.

The displacement means 76 comprises a pin 112 extending diametrically through the small portion 82 of the shaft 38 and a diametrical slot 114 in the inertia wheel 74 with ramps 116 extending axially outwardly from the slot 114 for coacting with the pin 112 to move the inertia wheel 74 axially along the small portion 82 of the shaft 38 toward the second clutch plate 72 in response to relative rotation between the shaft 38 and the inertia wheel 74. In other words, the ramps 116 are inclined upwardly from the slot 114 toward the outer face of the inertia wheel 74 so that upon relative rotation between the shaft 38 and the inertia wheel 74, the inertia wheel 74 will be moved axially toward the second clutch plate 72.

As described, the small portion 82 of the shaft 38 extends outwardly of the side 26 and the bar 78 is disposed outwardly of the second side 26 and about the smaller diameter 82 of the shaft for reacting against the larger diameter of the shaft.

The projection or pin 64 extends through the slot 68 in the second side 26 and through the slot 88 in the bar 78 and through a slot 118 in the second clutch plate 72.

OPERATION

When not in use, the seat belt 16 is fully wound about the reel means 14 as shown in FIGS. 2 and 3. To utilize the seat belt it is unwound from the reel means 14. As the seat belt is initially unwound, the first clutch plate 70 is rotated in a counterclockwise direction as viewed in FIG. 1 due to being in frictional driven engagement with the ratchet member 46 through the washer 92 and the friction disk 90 so that the shoulder 108 thereof engages the projection or pin 64 to retain the locking pawl 58 in the unlocked position as viewed in FIG. 3.

While the belt 16 is initially being extended or unwound from the assembly and the first clutch plate 70 maintains the locking pawl in the unlocked position shown in FIG. 3, the projection 64 also retains the bar 78 in the position illustrated in FIG. 3 so that the small or thin thickness 84 thereof is disposed about the small portion 82 of the shaft 38. In this situation, if an inordinate rotational acceleration of the reel means occurs, the inertia wheel 74 would move axially along the small portion 82 of the shaft but there would not be any or sufficient frictional forces imposed upon the second clutch plate 72 by way of the frictional disk 94 to cause any damage due to the fact that the second clutch plate 72 is prevented from rotating due to the disposition of the projection or pin 64.

The assembly will remain in this condition so long as the seat belt is continuously unwound from the retractor assembly. Once the seat belt is no longer being unwound and there follows a slight winding movement of the seat belt, which always occurs, the first clutch plate 70 rotates in the clockwise direction to remove the shoulder 108 from engagement with the projection 64 whereby the locking pawl 58 is allowed to move to the position illustrated in FIG. 4.

Once the assembly is in the condition illustrated in FIG. 4, and there occurs a predetermined rotational acceleration of the reel means 14, the inertia wheel 74 does not rotate as fast as the shaft 38 and therefore the pin 112 moves up the ramps 116 to effect axial movement of the inertia wheel 74 towards the second clutch plate 72. In this position the bar 78 has moved radially forward relative to the shaft under the action of the spring 100 so that the thicker portion 86 thereof is disposed about the small portion 82 of the shaft. As a consequence thereof, upon axial movement of the inertia wheel 74 there occurs frictional driving engagement with the second clutch plate 72 through the second frictional disk 94 as shown in FIG. 7 to rotate the second clutch plate 72 in the counterclockwise direction. As the second clutch plate 72 rotates in the counterclockwise direction the slot 118 coacts with the projection or pin 64 to move the locking pawl 58 to the locked position in engagement with the ratchet teeth about the ratchet members 44 and 46; thus, preventing further extension or unwinding of the seat belt 16.

Upon the tension being removed from the seat belt 16 the spring within the housing 54 will cause the seat belt to wind back upon the reel means. During the winding of the seat belt upon the reel means the clip 60 coacts with the seat belt to move the locking pawl 58 back to the unlocked position shown in FIG. 3 when the seat belt is fully wound on the retractor means. Snap ring 59 is disposed in a groove 61 in the shaft 38 and engages the outside of side wall 24 to retain the shaft in position.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

The embodiments of the invention in which an exclusive property or privilege is claimed are defined as follows:

1. A retracting reel assembly comprising: support means; reel means rotatably supported by said support means; an elongated flexible element connected to said reel means and adapted to be wound thereon and unwound therefrom; locking means movable between locked and unlocked positions for respectively preventing and allowing rotation of said reel means; and control means for controlling movement of said locking means to said locked position, said control means including first clutch means for preventing said locking means from moving to said locked position during continuous unwinding rotation of said reel means from the fully wound position, inertia means for disposition in an operative condition in response to a predetermined rotational acceleration of said reel means in the unwind direction, and second clutch means for moving said locking means to said locked position in response to said inertia means being in said operative condition.

2. A retracting reel assembly comprising: support means; reel means rotatably supported by said support means; an elongated flexible element connected to said reel means and adapted to be wound thereon and unwound therefrom; locking means movable between locked and unlocked positions for respectively preventing and allowing rotation of said reel means; and control means for controlling movement of said locking means to said locked position, said control means including first clutch means for preventing said locking means from moving to said locked position during continuous unwinding rotation of said reel means from the fully wound position and until winding rotation of said reel means subsequent to said continuous unwinding, inertia means for disposition in an operative condition in response to a predetermined rotational acceleration of said reel means in the unwind direction, second clutch means for moving said locking means to said locked position in response to said inertia means being in said operative condition, and deactivating means for rendering said second clutch means nonresponsive to said inertia means while said first clutch means is preventing said locking means from moving to said locked position.

3. An assembly as set forth in claim 2 wherein said reel means has an axis of rotation, said first clutch means being supported for rotation about said axis, said second clutch means being supported for rotation about said axis, said inertia means being supported for rotation about said axis.

4. An assembly as set forth in claim 3 wherein said first clutch means is disposed in frictional driven relationship with said reel means.

5. An assembly as set forth in claim 4 wherein said second clutch means is disposed in frictional driven relationship with said inertia means when moving said locking means to said locked position.

6. An assembly as set forth in claim 5 including return means for returning said locking means to said unlocked position when said reel means returns to said fully wound position.

7. An assembly as set forth in claim 5 wherein said reel means includes a shaft rotatably supported by said support means, said first clutch means includes a first clutch plate supported by said shaft for rotation relative thereto, said second clutch means includes a second clutch plate supported by said shaft for rotation relative thereto, and said inertia means includes an inertia wheel supported on said shaft and displacement means for moving said inertia wheel along said shaft in response to said predetermined acceleration.

8. An assembly as set forth in claim 7 wherein said deactivating means includes a bar with an elongated slot therein disposed about said shaft, said bar being disposed between said support means and said second clutch plate, said second clutch plate being disposed between said bar and said inertia wheel, said bar having a first thickness along a first portion of said slot for allowing axial movement of said inertia wheel without causing rotation of said second clutch plate thereby, said bar having a second thickness along a second portion of said slot which is thicker than said first thickness for reacting with said second clutch plate to cause rotation of said second clutch plate in response to axial movement of said inertia wheel.

9. An assembly as set forth in claim 8 including connection means operatively interconnecting said bar and said locking means for controlling the radial movement of said bar relative to said axis.

10. An assembly as set forth in claim 9 including a first friction disk disposed about said shaft between said first clutch plate and said reel means for transmitting rotary motion of said reel means to said first clutch plate.

11. An assembly as set forth in claim 10 including a second friction disk disposed between said inertia wheel and said second clutch plate for transmitting rotary motion of said inertia wheel to said second clutch plate.

12. An assembly as set forth in claim 11 including first spring means disposed between said support means and first clutch plate, second spring means disposed between said inertia wheel and said second friction disk.

13. An assembly as set forth in claim 12 wherein said locking means includes a projection and said second clutch plate has a slot therein through which said projection extends.

14. An assembly as set forth in claim 13 wherein said bar has a second slot therein through which said projection extends to define said connection means.

15. An assembly as set forth in claim 14 including first biasing means urging said bar to move radially relative to said axis in the direction to dispose said second thickness thereof about said shaft.

16. An assembly as set forth in claim 15 including second biasing means for urging said second clutch plate to rotate in the unwinding direction.

17. An assembly as set forth in claim 16 wherein said first clutch plate includes a shoulder therein for reacting with said projection to prevent said locking means from moving to said locked position.

18. An assembly as set forth in claim 17 including a cup-shaped washer disposed about said shaft between said bar and said second clutch plate with the outer periphery thereof engaging said second clutch plate.

19. An assembly as set forth in claim 18 wherein said shaft has a large diameter along the portion extending through said first friction disk and said first clutch plate; said shaft has a smaller diameter along the portion thereof extending through said bar, said cup-shaped washer, said second clutch plate, said second friction disk and said inertia wheel.

20. An assembly as set forth in claim 19 wherein said displacement means comprises a pin extending diametrically through said shaft and a diametrical slot in said inertia wheel with ramps extending axially outwardly therefrom for coacting with said pin to move said inertia wheel axially along said shaft toward said second clutch plate in response to relative rotation between said shaft and said inertia wheel.

21. An assembly as set forth in claim 20 wherein said support means includes a generally U-shaped bracket having a base and parallel first and second sidewalls; said shaft extends between said side walls and is rotatably supported thereby, said smaller diameter portion of said shaft extends outwardly of said second wall; said reel means includes a cylinder disposed concentrically about said shaft, a circular platelike ratchet member secured to each end of said cylinder, said ratchet members being nonrotatably attached to said large diameter portion of said shaft, said cylinder having a slot extending therealong, said elongated flexible member comprising a seat belt connected to said shaft and extending through said slot to be wound and unwound about said cylinder, and windup means disposed outwardly of said first side and reacting between said bracket and said shaft for urging said shaft to rotate in the winding direction; said locking means includes a rod extending between said walls and a locking pawl supported by said rod for movement into said locked position in engagement with said ratchet members; said first clutch plate being disposed between said second side and the adjacent ratchet member, said first spring means reacting between said second side and said first clutch plate, said first friction disk being disposed between said first clutch plate and the adjacent ratchet member, a washer member disposed between said first friction disk and the adjacent ratchet member, said bar being disposed outwardly of said second side and about said smaller diameter portion of said shaft for reacting against said larger diameter portion of said shaft, said second side having a slot therethrough and said projection extends through said slot in said second side and through said second slot in said bar and through a slot in said second clutch plate; and including return means for returning said locking means to said unlocked position when said reel means returns to said fully wound position.

* * * * *